(12) United States Patent
Novak et al.

(10) Patent No.: US 9,301,281 B2
(45) Date of Patent: Mar. 29, 2016

(54) MECHANISMS FOR TIMING AND SIGNALING COORDINATION IN MULTI-POINT CONNECTIVITY

(71) Applicant: BlackBerry Limited, Waterloo (CA)

(72) Inventors: Robert Novak, Stittsville (CA); William Anthony Gage, Stittsville (CA); Biswaroop Mukherjee, Stittsville (CA); Yufei Wu Blankenship, Kildeer, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 214 days.

(21) Appl. No.: 13/774,894

(22) Filed: Feb. 22, 2013

(65) Prior Publication Data

US 2014/0241225 A1     Aug. 28, 2014

(51) Int. Cl.
H04W 72/02     (2009.01)
H04J 11/00     (2006.01)

(52) U.S. Cl.
CPC ............ *H04W 72/02* (2013.01); *H04J 11/0023* (2013.01)

(58) Field of Classification Search
None
See application file for complete search history.

(56) References Cited

U.S. PATENT DOCUMENTS

| | | | | |
|---|---|---|---|---|
| 7,664,467 B2* | 2/2010 | Cheng et al. | .................... | 455/70 |
| 8,724,563 B2* | 5/2014 | Yoo et al. | ...................... | 370/329 |
| 2009/0040972 A1* | 2/2009 | Robson et al. | ................ | 370/329 |
| 2009/0238141 A1* | 9/2009 | Damnjanovic et al. | ....... | 370/331 |
| 2010/0135159 A1* | 6/2010 | Chun et al. | .................... | 370/241 |
| 2010/0240386 A1* | 9/2010 | Hamabe et al. | ............ | 455/452.2 |
| 2011/0021221 A1* | 1/2011 | Kondo | ........................... | 455/501 |
| 2012/0002598 A1* | 1/2012 | Seo et al. | ...................... | 370/315 |
| 2012/0258724 A1* | 10/2012 | Kim et al. | .................. | 455/452.2 |
| 2012/0320883 A1* | 12/2012 | Seo et al. | ...................... | 370/336 |
| 2012/0322453 A1* | 12/2012 | Weng et al. | .................. | 455/450 |
| 2012/0327873 A1* | 12/2012 | Kim et al. | .................... | 370/329 |
| 2013/0021929 A1* | 1/2013 | Kim | ............................. | 370/252 |
| 2013/0028200 A1* | 1/2013 | Nory et al. | .................... | 370/329 |
| 2013/0028211 A1* | 1/2013 | Li et al. | ......................... | 370/329 |
| 2013/0028236 A1* | 1/2013 | Jung et al. | .................... | 370/331 |

(Continued)

FOREIGN PATENT DOCUMENTS

EP     2389026 A1 * 11/2011
WO     2012108679 A2     8/2012

(Continued)

OTHER PUBLICATIONS

Gage, William Anthony, et al.; U.S. Appl. No. 13/611,437 entitled "Mobile Station-Assisted Interference Mitigation"; filed Sep. 12, 2012.

(Continued)

*Primary Examiner* — Hassan Kizou
*Assistant Examiner* — Hashim Bhatti
(74) *Attorney, Agent, or Firm* — Conley Rose, P.C.; J. Robert Brown, Jr.

(57) ABSTRACT

A method for communication in a wireless telecommunications network is provided. The method comprises coordinating, by a wireless device, with a first network node to identify a first radio resource configuration comprising a first set of radio resources which is used by the wireless device to communicate with the first network node. The first set of radio resources comprises at least one of radio resources in which the wireless device transmits to the first network node, or radio resources in which the wireless device receives from the first network node.

23 Claims, 14 Drawing Sheets

(56) References Cited

U.S. PATENT DOCUMENTS

| | | | |
|---|---|---|---|
| 2013/0040675 A1* | 2/2013 | Ant et al. | 455/509 |
| 2013/0115968 A1* | 5/2013 | Wegmann et al. | 455/452.1 |
| 2013/0165122 A1* | 6/2013 | Tanaka | 455/436 |
| 2013/0203398 A1* | 8/2013 | Callard et al. | 455/418 |
| 2013/0223258 A1* | 8/2013 | Seo et al. | 370/252 |
| 2013/0223393 A1* | 8/2013 | Jung et al. | 370/329 |
| 2013/0286849 A1* | 10/2013 | Park | 370/241 |
| 2014/0307688 A1* | 10/2014 | Nagata et al. | 370/329 |

FOREIGN PATENT DOCUMENTS

| | | | |
|---|---|---|---|
| WO | 2012155236 A1 | | 11/2012 |
| WO | WO 2012155236 A1 * | | 11/2012 |

OTHER PUBLICATIONS

3GPP TS 36.211 V11.1.0; 3rd Generation Partnership Project; Technical Specification Group Radio Access Network; Evolved Universal Terrestrial Radio Access (E-UTRA); Physical Channels and Modulation; Release 11; Dec. 2012; 108 pages.

3GPP TS 36.213 V11.1.0; 3rd Generation Partnership Project; Technical Specification Group Radio Access Network; Evolved Universal Terrestrial Radio Access (E-UTRA); Physical Layer Procedures; Release 11; Dec. 2012; 160 pages.

3GPP TS 36.300 V9.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 9; Dec. 2009; 178 page.

3GPP TS 36.300 V11.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Dec. 2012; 208 pages.

3GPP TS 36.321 V11.1.0; 3rd Generation Partnership Project; Technical Specification Group Radio Access Network; Evolved Universal Terrestrial Radio Access (E-UTRA); Medium Access Control (MAC) Protocol Specification; Release 11; Dec. 2012; 57 pages.

3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.

3GPP TR 36.814 V9.0.0; 3rd Generation Partnership Project; Technical Specification Group Radio Access Network; Evolved Universal Terrestrial Radio Access (E-UTRA); Further Advancements for E-UTRA Physical Layer Aspects; Release 9; Mar. 2010; 104 pages.

3GPP TSG-RAN WG2 Meeting #58; "Additional DCH RAB Combinations"; R2-071611; Kobe, Japan; May 7-11, 2007; 9 pages.

Jungnickel, V., et al.; "Coordinated Multipoint Trials in the Downlink"; GLOBCOM Workshops; Dec. 2009; 7 pages.

European Extended Search Report; Application No. 14156252.0; Jun. 20, 2014; 10 pages.

* cited by examiner

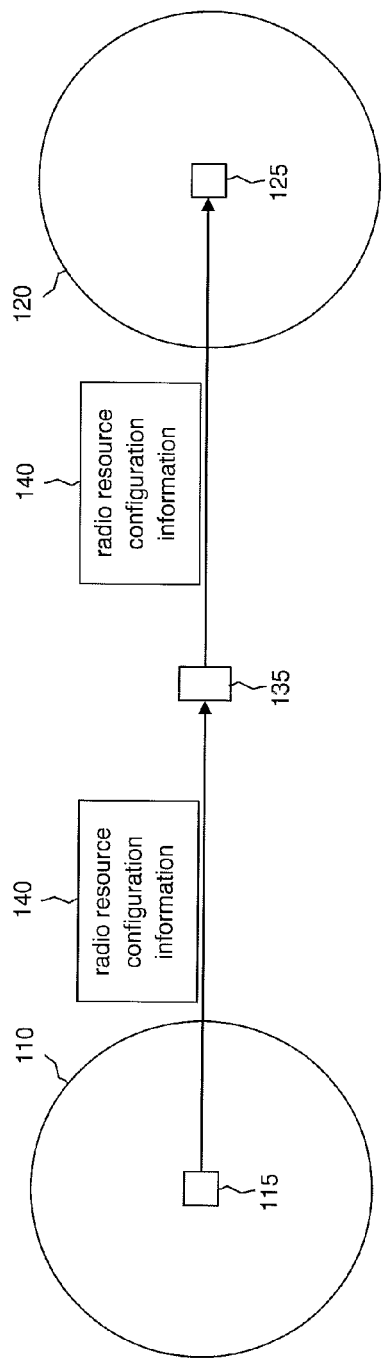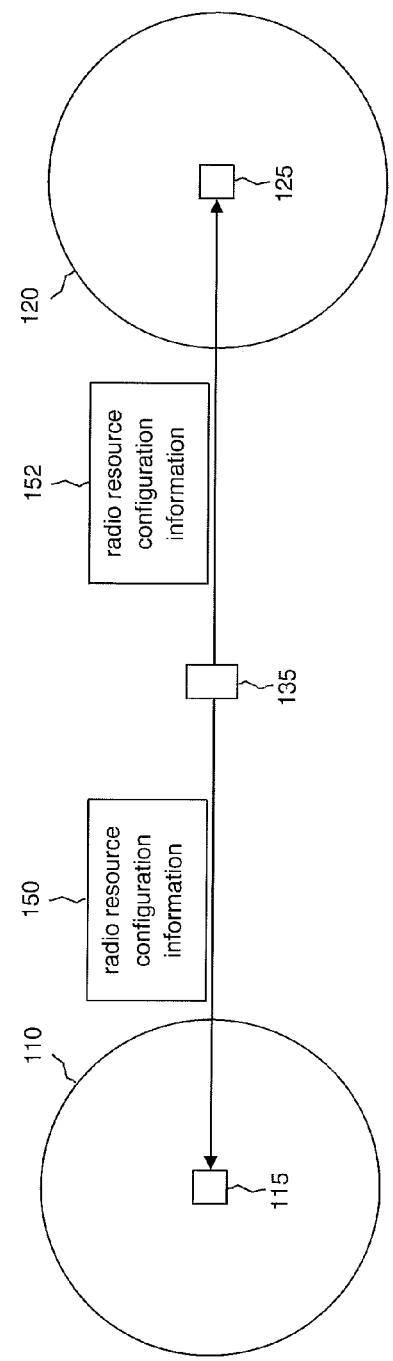

US 9,301,281 B2

MECHANISMS FOR TIMING AND SIGNALING COORDINATION IN MULTI-POINT CONNECTIVITY

FIELD OF THE DISCLOSURE

The present disclosure relates to signaling coordination in wireless telecommunications systems.

BACKGROUND

As used herein, the term "wireless device" (alternatively "WD") might in some cases refer to mobile devices such as mobile telephones, personal digital assistants, handheld or laptop computers, and similar devices that have telecommunications capabilities. Such a WD might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a WD might include the device itself without such a module. In other cases, the term "WD" might refer to devices that have similar capabilities but that are not transportable, such as desktop computers, set-top boxes, or network appliances. The term "WD" can also refer to any hardware or software component that can terminate a communication session for a user. Also, the terms "wireless device", "WD", "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component may be referred to herein as a base station or a BS. That is, the term "base station" as used herein may be a generic term that encompasses macro cellular base stations and small cell base stations. Such a component may also be referred to herein as an access node or a network element.

Any set of cells that includes one or more cells with a smaller coverage area than the typical coverage area of a traditional eNB may be referred to herein as a small cell deployment. A cell with the relatively large coverage area provided by a traditional eNB may be referred to herein as a macro cell. A cell with a relatively smaller coverage area than a macro cell may be referred to herein as a small cell, a micro cell, a pico cell, or a femto cell. Alternatively or additionally, a macro cell may be considered a high power cell, and a small cell may be considered a low power cell. The access node in a macro cell may be referred to as a macro base station, a macro eNB, or a macro node, and the access node in a small cell may be referred to as a small cell base station, a pico base station, a femto base station, or a relay node. A cell or sector is a portion of the coverage area served by a base station. Each cell has a set of radio resources that can be associated with that cell through, for example, a unique cell identifier.

LTE may be said to correspond to aspects of Third Generation Partnership Project (3GPP) Release 8 (Rel-8) and subsequent releases.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a diagram of a heterogeneous coverage model according to an embodiment of the disclosure.

FIG. 3 is a diagram of a heterogeneous coverage model according to another embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

The embodiments disclosed herein provide mechanisms that allow a wireless device to actively assist in coordinating transmissions to and from multiple network nodes in a radio access environment. The term "network node (NN)" refers to an entity that manages the radio resources within a cell. Without losing generality, the term "network node" used in the descriptions below comprises any network element, such as a base station, an access point, a relay node, or a remote radio head, capable of wirelessly transmitting to, and receiving from, a wireless device using the radio resources of a cell. A wireless device may provide an indication to one or more network nodes to coordinate the timing of assignments, transmissions, and signaling channels to support a means for the wireless device to maintain connections with multiple network nodes at the same time while reducing the network node coordination requirements on the backhaul. This coordination may be provided by a wireless device using the radio links that directly connect the wireless device to the network nodes, enabling contemporaneous reception and transmission from multiple network nodes.

In wireless communications systems, higher capacity may, in general, require a higher signal to interference-plus-noise ratio (SINR). A consistently higher SINR over a significant percentage of a cell's coverage area may, in general, require smaller cells, or rather, may require operation in a smaller region of a cell when transmitting at a given power level. Hence, the current network model of higher power outdoor macro cells may need to be augmented by a set of lower power indoor and outdoor micro and pico cells in order to increase system capacity and wireless device throughput.

Figure 1:
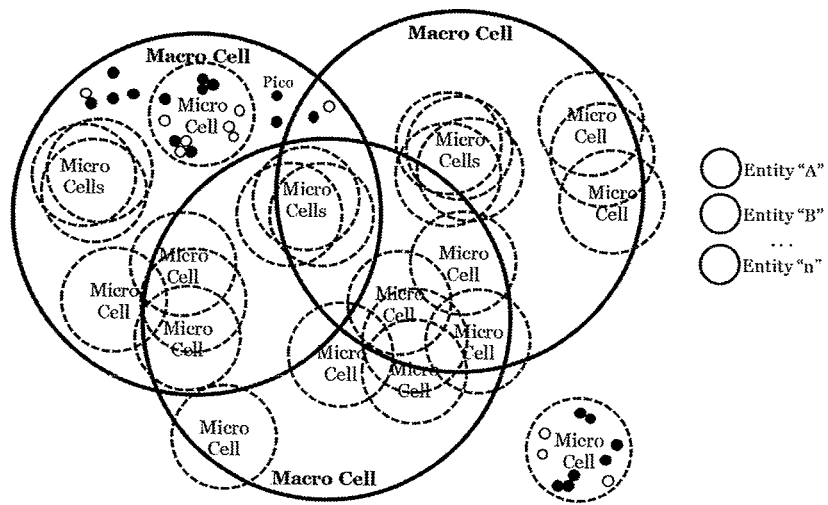
FIG. 1 is a diagram of a heterogeneous coverage model according to the prior art.

The move towards smaller cells may significantly increase the number of base stations in a system and may also lead to significant coverage overlap—both planned and unplanned—between cells. Such a heterogeneous coverage model is illustrated in FIG. 1. While transmission and reception within a given cell may be coordinated by the network node responsible for that cell, operation across cell boundaries may be uncoordinated due to the vagaries of radio propagation, different administrative domains, and/or the difficulties in communicating between network nodes. Uncoordinated operation may result in unacceptable levels of interference that may negate the benefits of improved signal levels garnered through the use of smaller cells.

Several techniques currently exist for managing communication between a wireless device and a plurality of network nodes. For example, coordinated multi-point (CoMP) transmissions have been used to enhance processing of received signals at a wireless device and/or to mitigate the effects of interference caused by contemporaneous use of the same resources in different cells. CoMP may require tightly synchronized transmission from multiple cooperating network nodes that actively transmit to a wireless device on the same time-frequency resources. The transmissions are coordinated between the network nodes, and the coordination may be transparent to the wireless device. Practical limitations imposed by current backhaul technology may make it difficult to realize the level of synchronization required for CoMP.

Another existing technique for managing communication between a wireless device and a plurality of network nodes involves the use of almost blank subframes. Almost blank subframes (ABS) may be scheduled for time domain sharing of radio resources between a macro cell and an underlying small cell or between neighboring small cells. In this model, a first network node refrains from scheduling transmissions (or schedules only low power transmissions) during certain subframes. This allows a second network node to schedule transmissions in those subframes and may result in lower interference for the wireless devices served by the second network node. ABS relies on the semi-static configuration of ABS patterns. Since these patterns may be based on anticipated traffic demand rather than on actual traffic demand, the provisioned ABS resources may be either under-utilized or insufficient to meet traffic demands.

FIGS. 2 and 3 illustrate two embodiments disclosed herein. In both figures, a first cell 110 with a first network node 115, a second cell 120 with a second network node 125, and a wireless device 135 are present. For clarity in the drawings, the second cell 120 is shown outside the coverage area of the first cell 110, but the second cell 120 may partially overlap with the first cell 110 or the second cell 120 may be entirely within the first cell 110. Also, while only two cells are shown, additional cells may be present.

In the embodiment of FIG. 2, the first network node 115 determines a configuration for radio resources that may be used in communication among the first cell 110, the second cell 120, and the wireless device 135. The determination of the radio resource configuration may be made by the first network node 115 alone or may be made by the first network node 115 in coordination with one or more other network nodes. In some embodiments, the radio resource configuration may be a configuration of radio resources in the first cell 110 and in the second cell 120 so that the wireless device 135 can communicate contemporaneously with the first network node 115 and with the second network node 125, and the radio resources may be configured such that conflicts do not occur in the communication. The radio resources may be some combination of time domain resources (e.g. sub-frames), frequency domain resources (e.g. sub-bands), spatial domain resources (e.g. MIMO spatial stream), and coding resources (e.g. orthogonal spreading codes). The first network node 115, possibly in coordination with other network nodes, may select a radio resource configuration from a predefined set of radio resource configurations. Alternatively, the first network node 115, possibly in coordination with other network nodes, may determine a radio resource pattern and place the radio resource pattern in a bitmap. After determining the radio resource configuration, the first network node 115 may transmit information 140 regarding the radio resource configuration to the wireless device 135. The wireless device 135 may then transmit the radio resource configuration information 140 to the second network node 125 and possibly to other network nodes.

In the embodiment of FIG. 3, the wireless device 135 determines a configuration for radio resources that may be used in communication among the first network node 115, the second network node 125, and the wireless device 135. Again, the radio resource configuration may be a combination of time domain resources, frequency domain resources, spatial domain resources, and coding resources on which the wireless device 135 is able to communicate with the first network node 115 and with the second network node 125. The determination of the radio resource configuration may be made by the wireless device 135 by selecting a configuration from a predefined set of configurations. After determining the radio resource configuration, the wireless device 135 may transmit a first set of information 150 regarding the radio resource configuration to the first network node 115 and may transmit a second set of information 152 regarding the radio resource configuration to the second network node 125. The wireless device 135 may also transmit radio resource configuration information to other network nodes.

In either FIG. 2 or FIG. 3, the wireless device 135 may be said to coordinate with the first network node 115 and/or the second network node 125. In some cases, the coordination may involve the wireless device 135 actively participating with the first network node 115 and/or the second network node 125 to determine a radio resource configuration. In other cases, the wireless device 135 does not actively participate in determining a radio resource configuration. Instead, the coordination may involve the wireless device 135 passing on to another network node a radio resource configuration that the wireless device 135 has received from the first network node 115 and/or the second network node 125 after the radio resource configuration has been determined by the first network node 115 and/or the second network node 125 without participation by the wireless device 135.

In an embodiment, radio resources are configured such that a first set of radio resources and a second set of radio resources are disjoint from one another. That is, the radio resource configuration is structured in a manner that ensures that no conflicts occur between transmissions on the first set of radio resources and transmissions on the second set of radio resources. For example, in an embodiment where the radio resources are subframes, the radio resources may be configured such that conflicting transmissions do not occur in a subframe.

Such embodiments may be implemented in cases where a WD is connected to multiple network nodes and where the number of radio frequency transmit and/or receive chains on the WD is less than the number of network nodes to which the WD is connected. For example, the WD may have only have one transmit and/or receive chain and may be connected to two or more network nodes. The WD may use the single transmit and/or receive chain to toggle communications between multiple network nodes, thus effectively communicating with multiple network nodes concurrently. Using the embodiments disclosed herein, the WD may coordinate the transmission and reception of multiple network nodes to facilitate information exchange, grant timings, and broadcast information acquisition.

In the disclosed embodiments, it may be assumed that the WD is able to communicate with more than one network node concurrently and has the necessary signaling to do so, such as a cell radio network temporary identifier (C-RNTI) or a transmit power control RNTI (TPC-RNTI). In an example, the WD may independently use random access methods to access each network node and may implement the embodiments disclosed herein. In another example, one network node may provide configuration information for the WD to connect to another network node as well.

In some cases, the participating network nodes may operate cells on different channels or frequency bands. In other cases, the network nodes may operate cells on the same frequency (i.e., a co-channel case) or may be overlapping in bandwidth. In the latter case, interference between downlink (DL) transmissions is not addressed herein, as such interference may be addressed by other methods, such as CoMP methods or ABS configurations. In some cases, the participating network nodes may operate cells using only the radio resources configured for a WD, such that the radio resource configuration is for all WDs, thus reducing or eliminating the interference on the DL between network nodes.

Details regarding time domain subframe switching for transmission and reception from more than one network node will now be provided. The process may involve designating specific subframes in the time domain from each network node during which the WD communicates with that network node. As a consequence of multiplexing subframes from several network nodes, time constants currently defined in LTE for uplink (UL) data transmissions following a UL grant, or UL or DL acknowledgement/negative acknowledgement (ACK/NAK) timing following a DL or UL transmission, respectively, may be changed from default values. Methods for frequency division duplex (FDD), time division duplex (TDD), and mixed FDD/TDD operation will also be described.

In some embodiments, the WD may actively communicate to multiple network nodes by sending a control message on the uplink to each of the network nodes designating an assignment of radio resources associated with each network node for reception on the DL and transmission on the UL. Embodiments are described herein in the context of time domain resources (sub-frames), but can be adapted for frequency domain and coding resources. The control message may inform the network nodes of the subset of the subframes where the WD may be expected to receive or send. Alternatively, the control message may inform the network nodes of the complement of that subset, namely, where the WD should not be expected to receive or send. The actuation of this configuration by either the serving network node or the WD is described in more detail below. The configuration is set per WD, such that each WD may have a different configuration potentially involving different network nodes.

For DL data transmissions, the subframes may be designated for reception from different network nodes such that the number of network nodes from which the WD is receiving transmissions in a single subframe is equal to or less than the number that can be supported by the configuration of the WD, and is given by $N_{BS\_DL\_max}$. The subframes may also be designated such that the WD is able to transmit an ACK/NAK on the UL to a network node $n_{DL\_ACK}$ subframes following transmission of a DL subframe to the WD by that network node, where $n_{DL\_ACK}$ is the configured number of subframes following a DL transmission for an ACK/NAK channel response.

For UL data transmissions, the subframes may be assigned for transmission to different network nodes such that the number of network nodes to which the WD may transmit in a single subframe is equal to or less than the number that can be supported by the configuration of the WD, and is given by $N_{BS\_UL\_max}$. The subframes may also be assigned such that the WD is able to receive an ACK/NAK on the DL from a network node $n_{UL\_ACK}$ subframes following transmission of a UL subframe to that network node, where $n_{UL\_ACK}$ is the configured number of subframes following a UL transmission for an ACK/NAK channel response. The subframes may also be assigned such that the WD is able to transmit data on the UL to a network node $n_{UL\_data}$ subframes following transmission of a uplink grant to the WD by that network node, where $n_{UL\_data}$ is the configured number of subframes for an uplink transmission following a uplink access grant transmission on the DL channel.

In addition, there may be some delay in switching between the subframes for the UL or DL of each network node.

The embodiments disclosed herein may be applicable to FDD operation, TDD operation, and mixed FDD/TDD operation. Regarding FDD operation, in an embodiment, subframes may be scheduled such that a wireless device has sufficient time to switch from one network node to another. The act of switching may include the adjustment of receive and transmission windows to account for differences in relative timing between network nodes. In some embodiments, the network nodes may be assumed to be frame synchronized, so the differences in transmit and receive timing may be the result of different propagation delays. In other embodiments, the network nodes may not be frame synchronized, which may require the introduction of "blank" (unusable) subframes in the WD subframe pattern to account for the differences in subframe timing.

Figure 4:
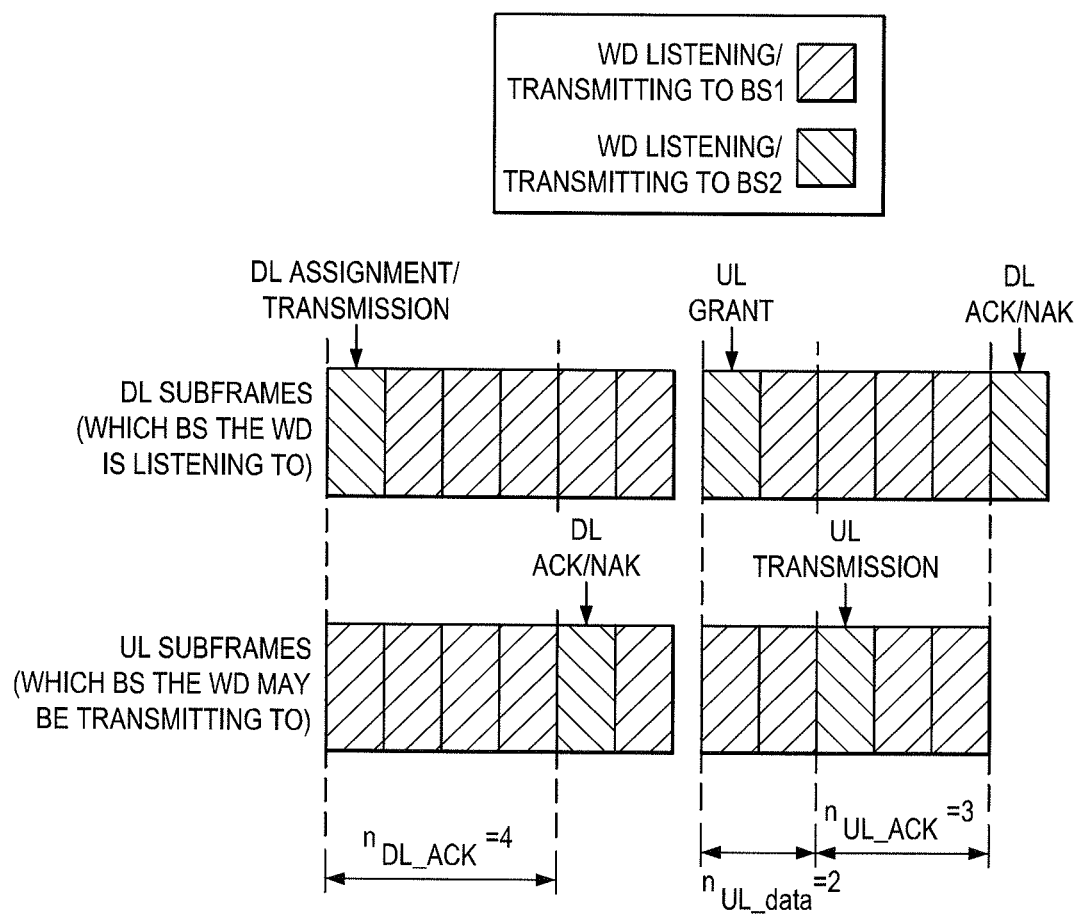
FIG. 4 is a subframe configuration for FDD reception/transmission for the DL transmission and ACK process and the UL grant, transmission, and ACK process with a particular set of constants, according to an embodiment of the disclosure.

In an embodiment, for the FDD case where the WD can transmit to and receive from only one network node at a time (i.e. $N_{BS\_UL\_max}=N_{BS\_DL\_max}=1$), the frames allocated to the process of a DL transmission and a UL transmission may be configured as shown in FIG. 4. In this example, the WD receives transmissions from BS1 (i.e., the serving network node) with the exception of particular subframes the WD uses to transmit to and receive from BS2.

In FIG. 4, the DL transmission and associated ACK/NAK on the UL are shown as separate from the UL grant, transmission, and ACK/NAK processes for simplicity. It may be noted that each of the timings can be set to different values. In this case, $n_{UL\_data}=2$, $n_{DL\_ACK}=4$, and $n_{UL\_ACK}=3$. These processes may be combined and simplified by noting that some DL messages and some UL messages may be sent in the same subframe.

Figure 5:
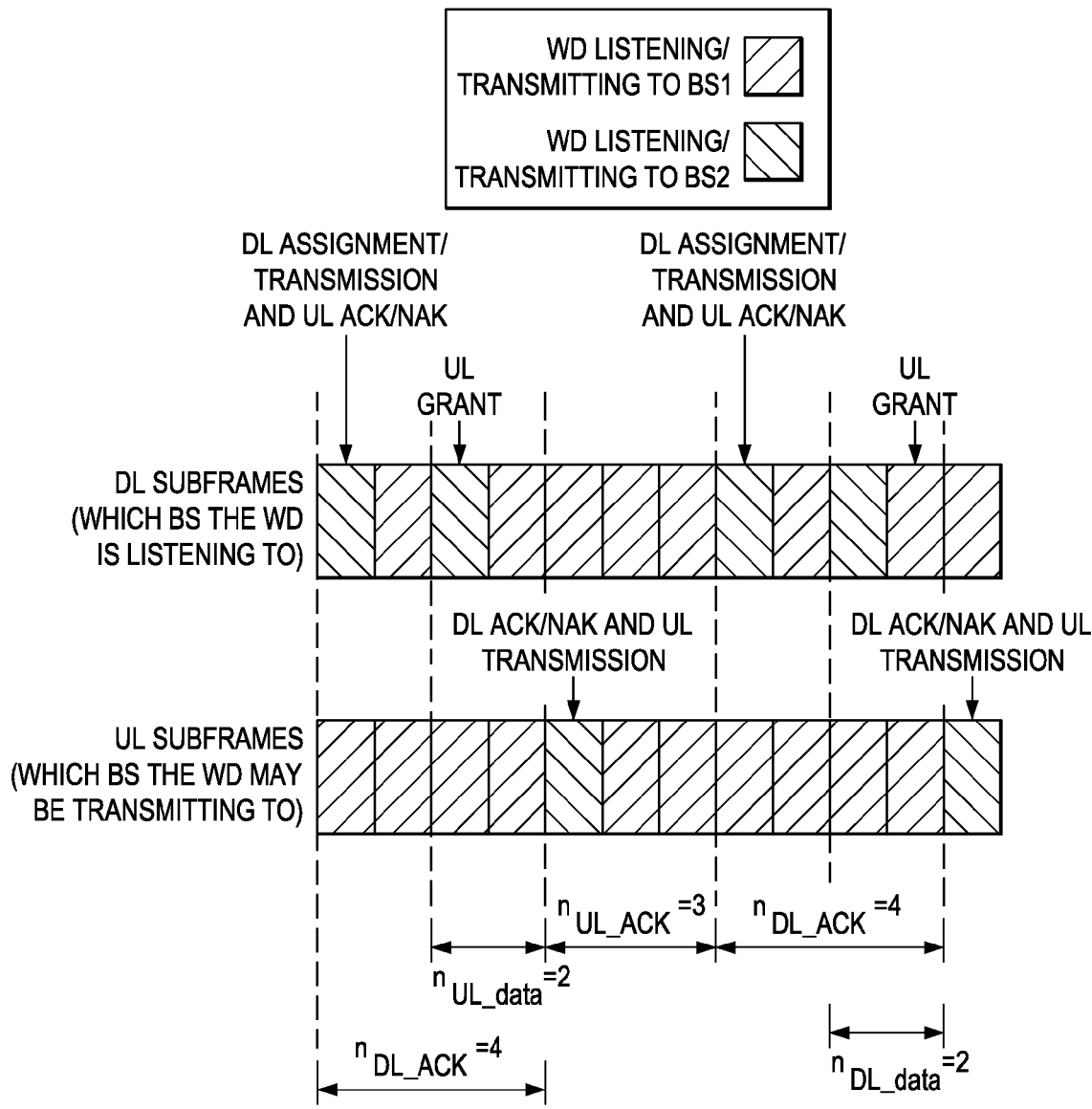
FIG. 5 is a subframe configuration for FDD reception/transmission with DL assignment/transmission in the same DL subframe as UL ACK/NAK and DL ACK/NAK in the same UL subframe as a UL data transmission with a particular set of constants, according to an embodiment of the disclosure.

For example, in FIG. 5, the same timings are used as in FIG. 4. However, the DL assignment and transmission is in the same DL subframe as the UL ACK/NAK, and the DL ACK/NAK is in the same UL subframe as the UL data transmission. This figure illustrates the case of a subframe configuration for a WD with constraints $N_{BS\_DL\_max}=N_{BS\_DL\_max}=1$ such that the WD listens to one network node per subframe and can transmit to only one network node. As such, the subframes on the DL and UL are assigned to a network node in pairs subject to the timing constraints.

Figure 6:
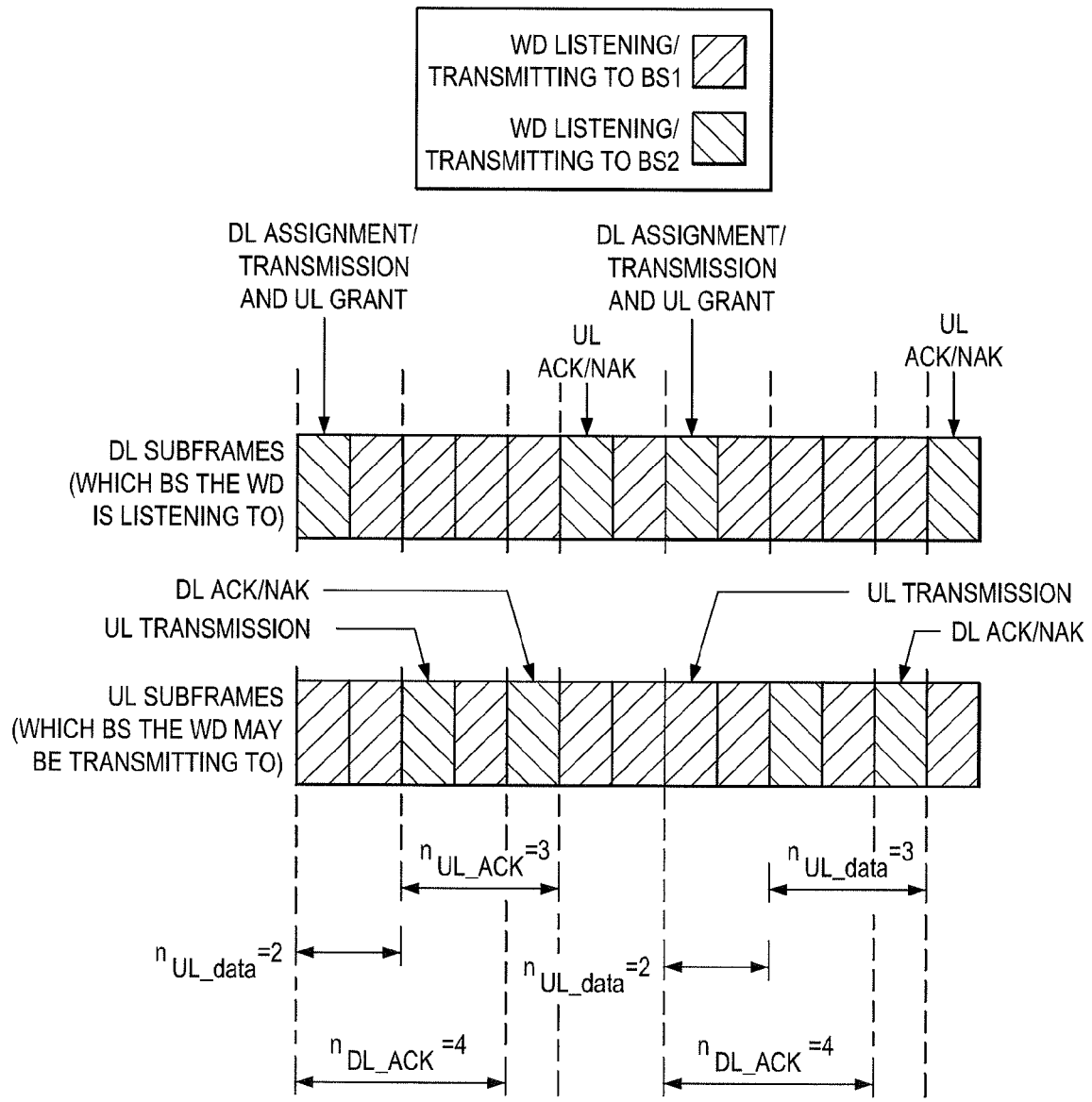
FIG. 6 is a subframe configuration for FDD reception/transmission with DL assignment/transmission in the same DL subframe as a UL grant with a particular set of constants, according to an embodiment of the disclosure.

FIG. 6 shows another example where DL assignment and transmission is in the same DL subframe as a UL grant.

It may be noted that, in some instances, the ACK/NAK and UL grant timings may be different from those of other WDs in the system (e.g., those connected to only one network node). Further, in some cases, the number of DL and UL subframes may not be the same. In either case, this may cause an issue in multiplexing of ACK/NAK feedback on the UL or DL, as there may not be a one-to-one relationship for data transmission subframe location and corresponding ACK/NAK subframe location. In some cases, there may not the same one-to-one correspondence for all WDs in the system. In some instances, this may require a separate resource space for ACK/NAK specific to WDs switching between network nodes. In other embodiments, ACK/NAK feedback from the transmissions related to several subframes may be aggregated into one or more subframes. This may be implemented in the same way that ACK/NAK feedback is aggregated to asymmetric UL/DL TDD partitions in LTE, for example, as given in Table 10.1.3.1-1 of 3GPP Technical Specification (TS) 36.213.

It may also be noted that BS1 has certain restrictions on its scheduling of the WD due to the WD being out of contact for some subframes. For example, BS1 may not send the WD with a UL grant on DL subframe 3 for UL transmission in UL subframe 5, as UL subframe 5 is reserved for UL communication with BS2.

Figure 7:
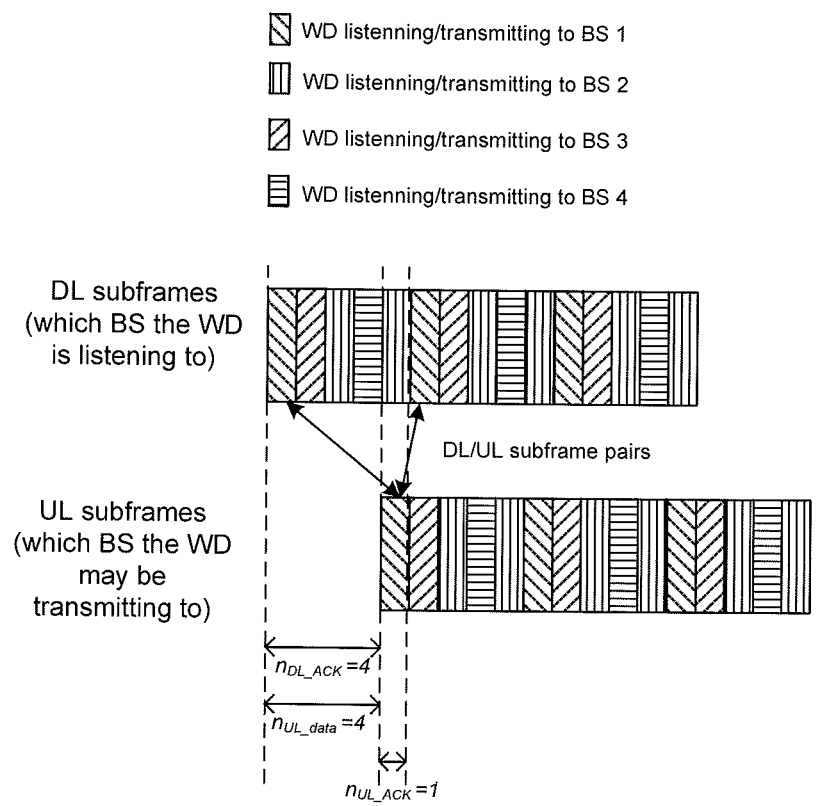
FIG. 7 is a subframe configuration for reception/transmission with a particular set of constants, according to an embodiment of the disclosure.

FIG. 7 illustrates the case of a subframe configuration for a WD with constraints $N_{BS\_DL\_max}=N_{BS\_UL\_max}=1$ with four network nodes total. In order to allow a regular pattern for all network nodes the $n_{UL\_data}$ and $n_{DL\_ACK}$ timings are the same. As such, the subframes on the DL and UL are assigned to a network node in pairs subject to the timing constraints.

In another embodiment, for the case where the WD can transmit and receive from only one network node at a time (i.e. $N_{BS\_DL\_max}=N_{BS\_UL\_max}=1$), the subframes for a WD are configured in pairs n subframes apart such that a WD can receive transmissions from a network node in the $i^{th}$ subframe and transmit to that network node in the $i^{th}+n$ subframe.

Figure 8:
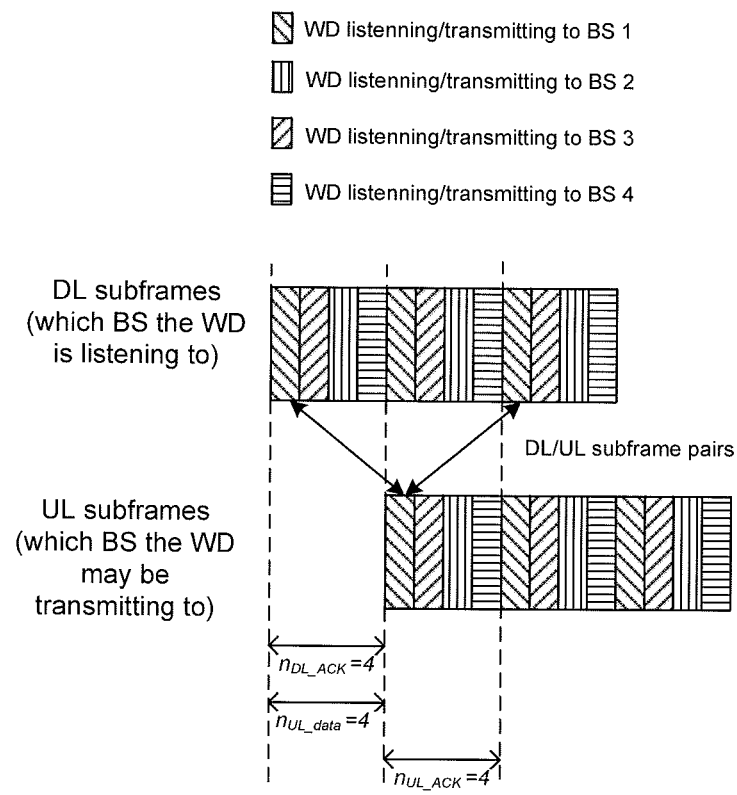
FIG. 8 is another subframe configuration for reception/transmission with a particular set of constants, according to an embodiment of the disclosure.

In systems such as LTE, the timings $n_{UL\_data}$, $n_{DL\_ACK}$, and $n_{UL\_ACK}$ may all be equal to four subframes in regular FDD operation. Using this timing in some embodiments, the system may be further simplified to consider $n_{UL\_data}=n_{DL\_ACK}=n_{UL\_ACK}=4$ as in FIG. 8. Hence, in the DL subframe, the WD may receive all downlink assignment messages and data (for example, in the LTE physical downlink control channel and physical downlink shared channel), UL assignment messages, and UL ACK/NAK responses. In the UL transmission subframe, the WD may transmit all UL data and DL ACK/NAK responses.

In the previous discussion, alignment to the subframe level was assumed between network nodes, and hence each subframe could be assigned to a different network node without overlap in the reception of signals. In another embodiment, it may be assumed that the WD has access to DL and UL timing information from previous transmissions or synchronization or from indications from the WD's serving network node.

Figure 9:
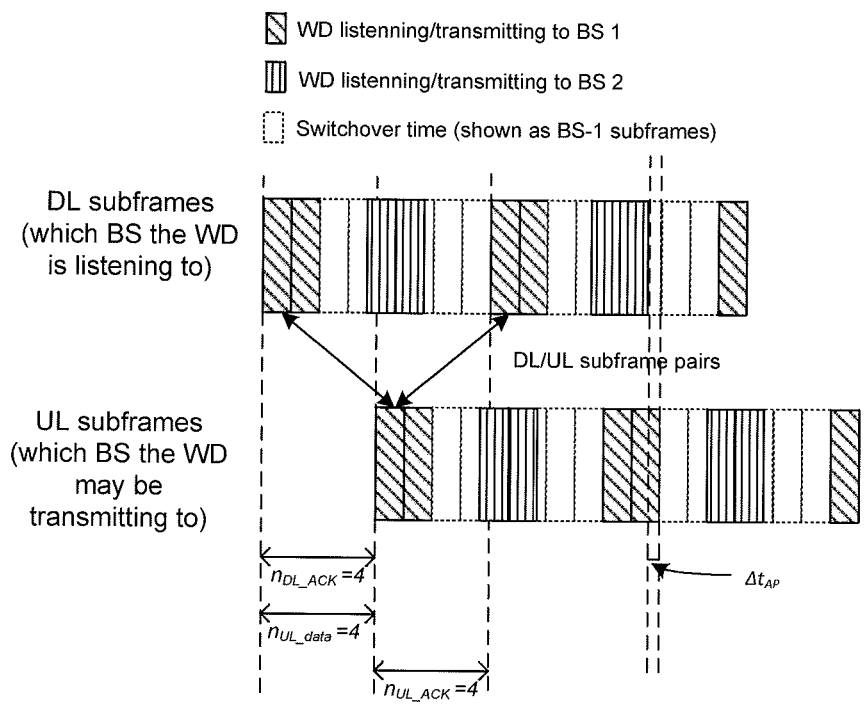
FIG. 9 is another subframe configuration for reception/transmission with a particular set of constants, according to an embodiment of the disclosure.
Figure 10:
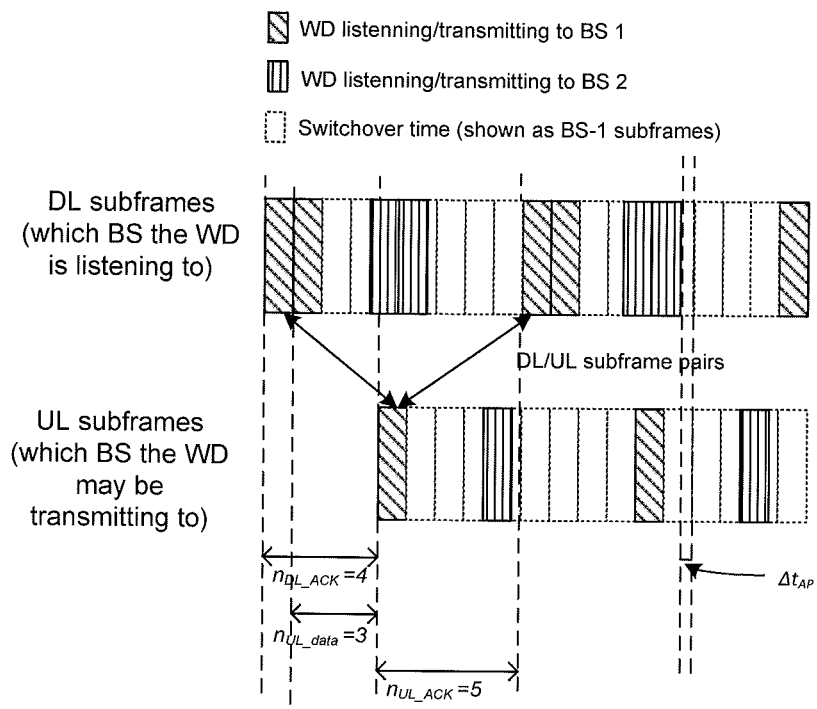
FIG. 10 is another subframe configuration for reception/transmission with a particular set of constants, according to an embodiment of the disclosure.

FIG. 9 illustrates the receiving and transmitting subframes for a WD that needs to switch between two network nodes allowing for misalignment of subframe transmissions and for time to switch subframe timing. FIG. 9 shows the case of grant and ACK/NAK timings being equal, while FIG. 10 illustrates the example of each timing being different. In some embodiments, it may be advantageous to switch between network nodes infrequently to minimize 'outage' periods during switchover. Also, while FIG. 9 illustrates the case of equal time transmitting and receiving allocated to each network node, it is possible that the WD is connected to the serving network node the majority of the time and occasionally connects to the other network node or network nodes.

Figure 11:
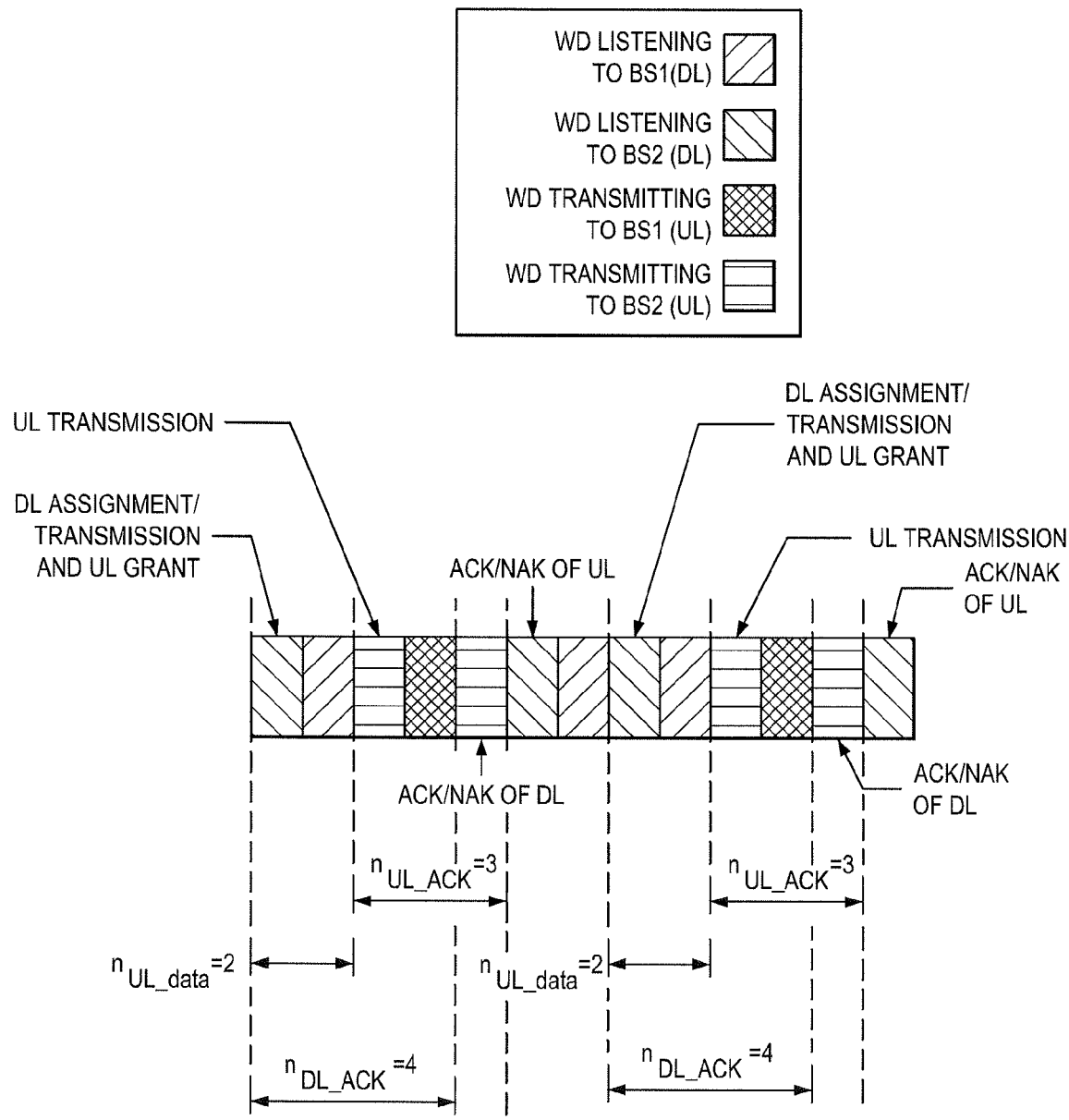
FIG. 11 is a subframe configuration for TDD reception/transmission with DL assignment/transmission in the same DL subframe as a UL grant with a particular set of constants, according to an embodiment of the disclosure, according to an embodiment of the disclosure.

While the previous discussion focused on embodiments for FDD operation, there may be similar embodiments for TDD operation. The WD may listen to different network nodes at different times. However, in TDD operation, the network nodes may be in UL or DL modes for a set of subframes. For example, the grant and ACK/NAK timings of FIG. 6 may be applied to a TDD structure with four DL subframes followed by three UL subframes for each network node, as illustrated in FIG. 11. In this case, the WD switches between listening to each network node during the DL subframes and opportunities to send to each network node during the UL subframes. In this example, the UL and DL subframe partitions are the same and are synchronized between network nodes.

On the other hand, the UL and DL subframe partitions may be different and uncoordinated for two network nodes the WD connects to. Assuming the UL/DL cycle length is the same between the network nodes, one way to handle switching between two network nodes is to switch in an integer number of cycle lengths. For example, if the UL/DL subframe partition always has a cycle length of ten subframes, then the partition pattern may repeat every ten subframes. In this case, regardless of the specific pattern each network node is configured with, the WD can switch between BS1 and BS2 in multiples of ten subframes.

The previous discussion has focused on embodiments for FDD operation and TDD operation where all network nodes the WD connects to share the same duplex scheme. In an alternative deployment, the network nodes may use different duplex schemes. For example, a macro cell may be deployed with FDD so that a large number of users can be served, while a small cell may be deployed with TDD. TDD is suitable for small cells since small cells are expected to cover only a small number of users, and the split between DL subframes and UL subframes may be adjusted to suit the traffic characteristics.

For a WD with one processing chain to be able to connect to two network nodes, the WD may need to listen to different network nodes at different times. With FDD in one network node (called BS1 in the following) and TDD in another network node (called BS2 in the following), several scenarios are possible. In a first scenario, a TDD network node is not deployed in the same carrier frequency of the FDD network node. In this case, the WD may need guard time to retune both transmit and receive frequency in the transceiver when the WD switches between the two network nodes. In a second scenario, TDD BS2 is deployed in the carrier frequency of the FDD DL ($f_{DL}$) of BS1. In this case, the WD may continue UL transmission for several subframes towards BS1 on the UL carrier frequency ($f_{UL}$), for example, if there is a need to complete ACK/NAK response to DL transmission. Afterwards, the WD may switch to transmitting on $f_{DL}$ towards BS2. In a third scenario, TDD BS2 is deployed in the carrier frequency of the FDD UL ($f_{UL}$) of BS1. In this case, the transmitting chain may not need to retune. The receiving chain may take a small gap time to retune to the new frequency $f_{UL}$.

Figure 12:
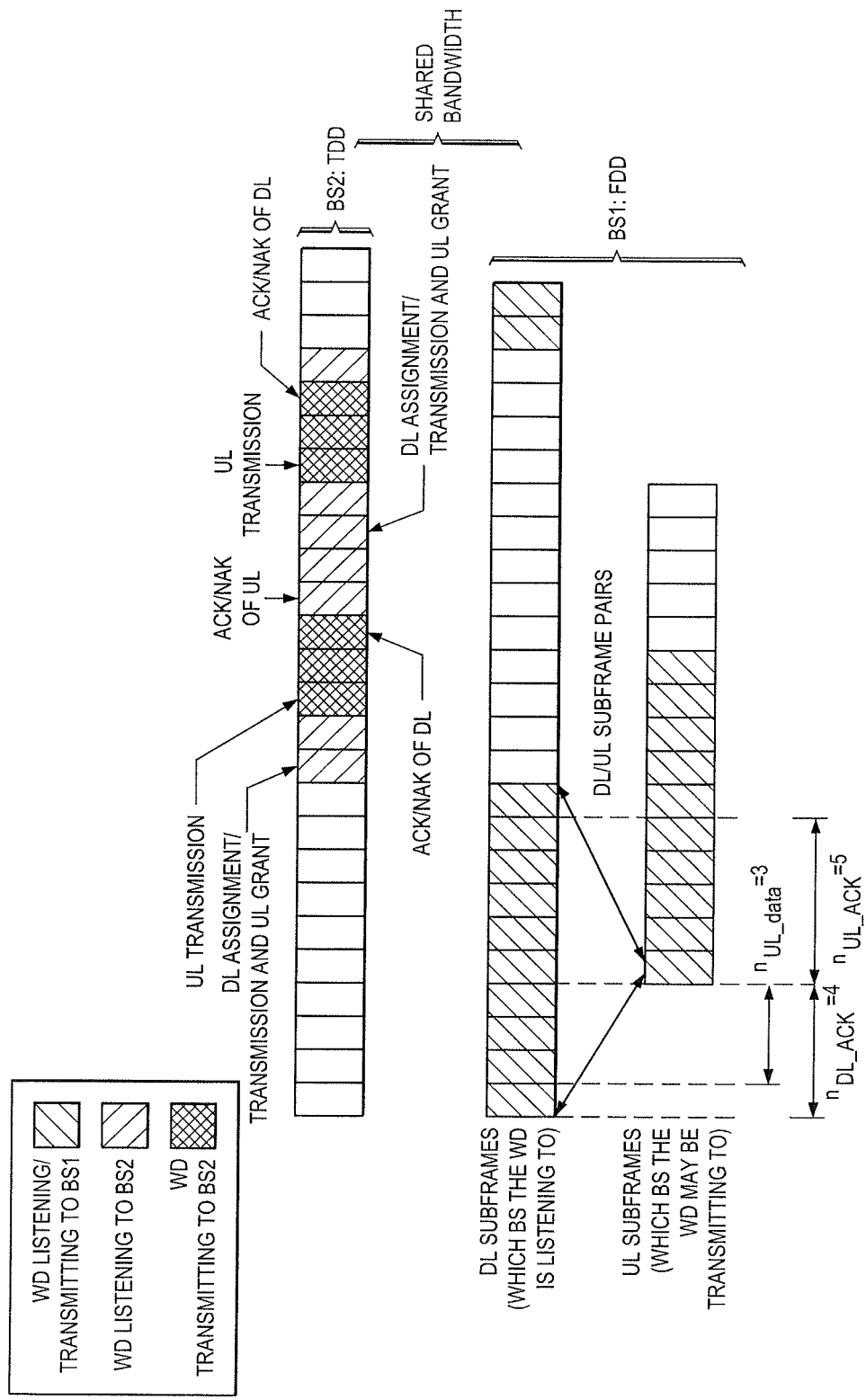
FIG. 12 is a subframe configuration for mixed FDD/TDD reception and transmission, according to an embodiment of the disclosure.

The second scenario is illustrated in FIG. 12. Since a certain amount of time may be needed for the WD to adjust the transmitting and/or the receiving circuit, it may be preferable that the transition between connecting to BS1 or BS2 is minimized.

Signaling details for subframe timing will now be described. In addition, details will be provided regarding supporting features such as timing advances, channel quality indication (CQI) feedback, and paging and broadcast channels.

One or more of the subframe configurations described above may be configured and indicated to all participating network nodes and a WD. Such a procedure may be initiated by instructions to the WD from one of the network nodes or by the WD without instructions from a network node. A network node that provides such instructions may be referred to herein as a serving network node. The configuration may be transmitted over radio resource control (RRC) signaling or medium access control (MAC) control element (CE) signaling.

In some embodiments, a serving network node instructs the WD to receive transmissions from, and send transmissions to, one or more other network nodes on specific subframes. In some cases, the network node communicates this information to those other network nodes so that the network nodes are able to schedule transmission on only those appropriate subframes. In other cases, the network node may instruct the WD to relay the information regarding transmission subframes to each participating network node. In another example, a potentially dominant network node, such as a macro network node, may be present in a heterogeneous network. The dominant network node may indicate its own subframe configuration for a WD as well as provide the configuration to one or more other network nodes, such as a pico network node. In some of these cases, the configuration for the macro network node and pico network nodes may be the same for more than one WD or potentially all WDs in the coverage of both the macro network node and the pico network nodes. In yet another example, a dominant serving network node is not present. The peer network nodes exchange information between each other to coordinate the subframe configuration, after which the agreed subframe configuration is signaled to the WD.

In some embodiments, the network node selects a pre-configured pattern of subframes and communicates its selection to the WD. The set of patterns may be predefined (e.g., in a standard), or may be broadcast over the entire cell (e.g., in a system information block (SIB)), or may be signaled specifically to a device by the network node (e.g., via RRC signaling).

In other embodiments the subframe pattern information may be conveyed as a bitmap from a network node, with each element of the bitmap indicating the network node with which the WD should communicate for DL or UL transmission in a given subframe. For example, in a UL bitmap, a "1" in the bitmap may indicate that the WD has opportunity to send to the network node, whereas a "0" may indicate the WD cannot send to the network node in that subframe (and in fact may be configured to send to another network node). The DL and UL bitmaps maybe sent separately or as one bitmap. For example, in an FDD system, separate bitmaps may be more useful. In a TDD system, one bitmap may be sufficient, as the UL/DL designation of each subframe may be known via the TDD DL/UL configuration. The network node may send a bitmap relating to its own transmit/receive configuration with the WD, or the network node may be responsible for configuring a transmit/receive configuration with the WD for all relevant network nodes.

The bitmap may include two variants. In one variant, the length of the bitmap is equal to the number of subframes, $N_B = \max\{n_{DL\_ACK}, n_{UL\_data} + n_{UL\_ACK}\}$. For example, in FIG. 9, this is equal to eight subframes. The pattern may be repeated every $N_B$ subframes. This configuration may also indicate a starting subframe or frame or alternatively may be linked to the start of the next frame. In another variant, the length of the bitmap is equal to the number of subframes in a frame. In LTE, the number subframes per frame is ten. The network nodes may repeat the configuration every frame, and hence there may be no need to signal a reference frame or subframe.

The subframe configuration information may be sent to the WDs by regular DL data channels (in LTE, by RRC messaging) or by another method such as the SIB.

In some embodiments, described in more detail below, timing information needed to connect to different network nodes may also be provided by the serving network node.

In some embodiments, the information sent by a network node may also contain a correction for the transmission timing between respective network nodes, for example, $\Delta t_{BS}$ in FIG. 9. It may be noted that this information may be further updated.

An example RRC message from a network node to a WD may contain a bitmap indicating the transmission/reception subframes for NN/WD communication. For example, there may be one bitmap for TDD and separate UL/DL bitmaps for FDD. Such an RRC message may optionally contain ACK/NAK and grant timings ($n_{DL\_ACK}$, $n_{UL\_data}$, $n_{UL\_ACK}$). An additional RRC message may be sent from the serving network node to a WD and may contain information regarding the configuration for a different network node. Alternatively, such information may be included in the same RRC message described above. This additional RRC message may include a bitmap indicating the transmission/reception subframes for a different network node and a physical cell ID of the different network node. The additional RRC message may optionally contain a subframe misalignment time ($\Delta t_{BS}$).

The previous discussion focused on embodiments where a serving network node determines a subframe configuration and informs a WD of the configuration. In other embodiments, the WD may configure the subframes according to the portion of information the WD intends to transmit to and receive from each of a plurality of network nodes. The WD then indicates to each network node which subframes the WD has suggested for use with that network node. Each network node may then accept or reject the designated subframe pattern based on scheduling restrictions in the network node.

In some embodiments, a WD selects a pre-configured pattern of subframes and communicates its selection to one or more network nodes. The set of patterns available to the WD may be predefined (e.g., in a standard) or may be broadcast to all devices (e.g., in a SIB) or may be signaled specifically to a particular device by the network node (e.g., via RRC signaling).

In some embodiments, this subframe pattern information may be conveyed as a bitmap to each network node, with each element of the bitmap indicating the WD's availability or unavailability for DL or UL transmission. The bitmap may indicate the network node to which the WD is to communicate for DL or UL transmission in a given subframe. For example, in a UL bitmap, a "1" in the bitmap may indicate that the WD has an opportunity to send to the network node, whereas a "0" may indicate that the WD cannot send to the network node in that subframe (and in fact may be configured to send to another network node). The DL and UL bitmaps may be sent separately or as one bitmap. For example, in an FDD system, separate bitmaps may be more useful. In a TDD system, one bitmap may be sufficient, as the UL/DL designation of each subframe may be known via the TDD DL/UL configuration. The DL and UL bitmaps may be sent separately or as one bitmap. The bitmap may include two variants. In one variant, the length of the bitmap is equal to the number of subframes, $N_B = \max\{n_{DL\_ACK}, n_{UL\_data} + n_{UL\_ACK}\}$. For example, in FIG. 9, this is equal to eight subframes. The pattern may be repeated every $N_B$ subframes. This configuration may also indicate a starting subframe or frame or alternatively may be linked to the start of the next frame. In another variant, the length of the bitmap is equal to the number of subframes in a frame. In LTE, the number subframes per frame is ten. The network nodes may repeat the configuration every frame, and hence there may be no need to signal a reference frame or subframe.

The subframe configuration information may be sent to the network nodes by regular UL data channels (in LTE, by RRC messaging) or by another method such as random access. Such a random access method is described in Patent Application Number PCT/CA2011/050306, filed on May 16, 2011, and entitled "Uplink Random Access Data Channel with HARQ", which is incorporated herein by reference.

In some embodiments, described in more detail below, timing information needed to connect to different network nodes may also be provided by the WD.

In some embodiments, the information sent to a network node may also contain a correction for the transmission timing, for example, $\Delta t_{BS}$ in FIG. 9. It may be noted that this information may be further updated.

An example RRC message from a WD to a network node may contain a bitmap indicating the transmission/reception subframes for NN/WD communication. For example, there may be one bitmap for TDD and separate UL/DL bitmaps for FDD. Such an RRC message may optionally contain ACK/NAK and grant timings ($n_{DL\_ACK}$, $n_{UL\_data}$, $n_{UL\_ACK}$).

An additional RRC message may be sent from the WD to a network node and may contain information regarding the configuration for a different network node. Alternatively, such information may be included in the same RRC message described above. This additional RRC message may include a bitmap indicating the transmission/reception subframes for a different network node and a physical cell ID of the different network node. The additional RRC message may optionally contain a subframe misalignment time ($\Delta t_{BS}$).

As mentioned above, in some embodiments, a serving network node may configure the subframe switching and report the configuration to one or more WDs. In further embodiments, the serving network node may indicate appropriate $n_{UL\_data}$, $n_{DL\_ACK}$, and $n_{UL\_ACK}$ timings to be used, such that the WD is able to communicate efficiently with multiple network nodes. For example, a macro network node may provide such timings for a WD to communicate with a macro network node and a pico network node. These timings may be provided to the WD through RRC configuration or one or more MAC CE messages.

In the embodiments where the WD configures the subframe switching and reports the configuration to one or more network nodes, the WD may indicate appropriate $n_{UL\_data}$, $n_{DL\_ACK}$, and $n_{UL\_ACK}$ timings to be used, such that the WD is able to communicate efficiently with multiple network nodes. These timings may be provided to the WD through RRC configuration or one or more MAC CE messages.

In some embodiments, the timing offset of the subframes, $\Delta t_{BS}$, may shift due to motion of the WD or other factors. In some cases, the shift may be different for the uplink subframes and the downlink subframes due to the round trip delay of a signal from the network node to the WD and then back to the network node. The timing offset may also change in time for a link between a wireless device and a given WD-NN link.

In order to maintain timing on the DL subframes, the WD may continue to reference the synchronization channel broadcast by each of the network nodes. In some cases, the synchronization channel is sent in the same subframes as the broadcast information, and hence the WD may receive the synchronization channel in one of the same techniques used to receive the broadcast information, as described below.

In order to maintain timing on the UL subframes, the WD may receive timing advancements from a network node in a DL message sent at any of the opportunities when the WD is listening to that network node. For example, each network node may provide timing advance messages within any of its physical downlink control channel (PDCCH) messages.

The relative timings may change for each network node due to movement of the WD relative to the network nodes or due to movement of one or more network nodes. The timing change may affect the relative receive time of the DL subframes from each network node, as well as change the UL subframe transmission timing to each network node. In some cases, conflicts may arise due to the change of various network node timings in which transmission or reception windows may overlap or may not allow sufficient transition time between UL and DL or may not allow enough time for ACK/NAK responses or UL grant processing. In these cases, the WD may detect potential conflicts to the WD's current schedule and send an uplink signal to request a change of the timing or subframe configuration to one or more network nodes to which the WD is connected.

The initial timing misalignment between subframes of different network nodes may be accounted for in the initial configuration of subframe patterns or pattern parameters. Further reconfigurations of subframe patterns or pattern parameters may be required if the timing misalignment changes substantially.

In some cases of WD or network node actuation of this feature, the WD may monitor and report the timing misalignment if changes in timing result in a conflict.

In some embodiments, when the subframe pattern is changed by the WD and/or the network node due to mobility, a WD may only be allowed to propose a new pattern after every K subframes. In other embodiments, a pattern proposed by the network node may be valid for L subframes. The values of K and L may be determined by the mobility of the WD with respect to a particular network node.

In some cases, the subframe switching pattern may provide opportunities for transmission, UL grants, ACK/NAK feedback, and so on. However, further restrictions may be applied at one or more network nodes to ensure sensible and conflict-free operation. In general, a network node may take into account the future subframe switching and assigned or configured UL grant or ACK/NAK message timings for a WD prior to sending a UL or DL assignment.

For example, FIG. 6 illustrates an example of subframe switching to provide opportunities for BS2 to transmit to and receive from the WD, along with a set of example UL grant and ACK/NAK timings. It may be noted that in DL subframe 5, BS2 may send a UL ACK/NAK response to the WD. However, BS2 is restricted from sending a UL grant. This is due to the timing of the UL transmission in response to the UL grant that would occur in UL subframe 7 according to the illustrated UL grant timing (i.e., two subframes). However, UL subframe 7 is reserved for UL communications with BS1 and hence UL transmission to BS2 is not possible.

In the disclosed embodiments, BS2 may be aware of the subframe switching pattern for present and future subframes for the WD, and therefore, BS2 may have the advance information to realize this conflict in advance and may therefore refrain from scheduling the WD in this subframe, as well as avoid similar conflicts in other subframes.

While the focus in FIG. 6 is on the operation of BS2, there may also be restrictions on BS1. In this example, BS1 has certain restrictions on its scheduling of the WD due to the WD being out of contact for some subframes. BS1, for example, may not send the WD a UL grant on DL subframe 3 for UL transmission in UL subframe 5, as UL subframe 5 is reserved for UL communication with BS2.

Hence, in the disclosed embodiments, each participating network node may be aware of the WD's switching pattern (with respect to itself, at least) for present and future subframes, and therefore, the network nodes may have the information to realize conflicts in advance and may therefore refrain from scheduling the WD in subframes that may bring about conflicts in transmission, ACK/NAK, or other defined signaling.

In some embodiments, the periodic structure as depicted in FIG. 9 allows periodic CQI feedback to be sent to each of the network nodes for use in future DL allocations and channel adaptation. For example, in one or more of the UL subframes assigned for transmission to a given network node, the WD also sends feedback. In one embodiment, this feedback may be equivalent to a dedicated control channel assigned to the WD, such as a physical uplink control channel (PUCCH) in LTE. In some embodiments, this process may be simplified if the periodicity of the UL feedback channel for the WD is the same as, or an integer multiple of, $n_{UL\_data} = n_{DL\_ACK}$.

In another embodiment, one or more network nodes may receive feedback from the WD via other means, such as a control message sent over the UL resources assigned for a data transmission. This feedback may be included with other UL data or as feedback only. Furthermore, in some cases, the DL ACK/NAK indication may also be included in such a message.

In yet another embodiment, the feedback to network nodes may be sent via random access methods, for example, those described in Patent Application Number PCT/CA2011/050306. In this case, the DL ACK/NAK indication may also be included in such a message.

The WD may have to access broadcast information from the network nodes periodically. Some of this information may be sent in periodic broadcast segments on the broadcast channel. For example, in LTE, the master information block (MIB) information is sent in each frame and can be combined with other frame MIB transmissions for improved decoding.

Some embodiments for the network node subframe configurations may employ a period of cycling through the subframes that is less than a frame duration. In this manner, the WD may listen to different portions of the frame each time the WD tunes to a network node. Thus, if the broadcast channel is repeated at the same point in each frame, the WD may eventually receive the broadcast channel (e.g., the MIB) regardless of where the broadcast channel is located in the frame.

In some embodiments where the WD is not able to receive broadcast channel information, as the WD is not receiving transmission at the appropriate time, the network node may send the information to the WD directly on the DL data channel at the next opportunity (e.g. via dedicated/RRC signaling). In another embodiment, the network node may only send an indication to the WD that the broadcast information has changed, allowing the WD to adjust the WD's reception cycle to retrieve the changed information from the broadcast channel.

The paging channel may be sent for several purposes. Typically, paging is sent for downlink data arrival. In addition, paging may also be sent to update system information.

When BS1 and BS2 both transmit a paging channel to the WD, the subframe timing may need to be configured such that paging occasions are preserved as much as possible for both network nodes. This may be difficult, especially for two TDD network nodes where the proportion of DL subframes is low for both network nodes.

Alternatively, only one network node (e.g., BS1) may be responsible for transmitting the paging channel. In this case, the configuration of subframe timing may be designed such that paging occasions for BS1 are preserved as much as possible. There may be no such concern for BS2.

In some cases, the WD may have the capability to receive transmissions from multiple network nodes simultaneously, such that $N_{BS\_DL\_max} > 1$. If the WD can also transmit to multiple network nodes simultaneously or at least in the same subframe, the WD (or the serving network node) may choose to schedule multiple network nodes to the same DL or UL subframe.

In cases where the WD cannot transmit to as many network nodes as it can receive from, two embodiments are provided. For the purposes of this example, $N_{BS\_DL\_max} = 2$ and $N_{BS\_UL\_max} = 1$ so that the WD is potentially receiving from two network nodes in a subframe, but may only transmit to one. The limitations for transmission to multiple network nodes may include complexity at the network node or power constraints.

Figure 13:
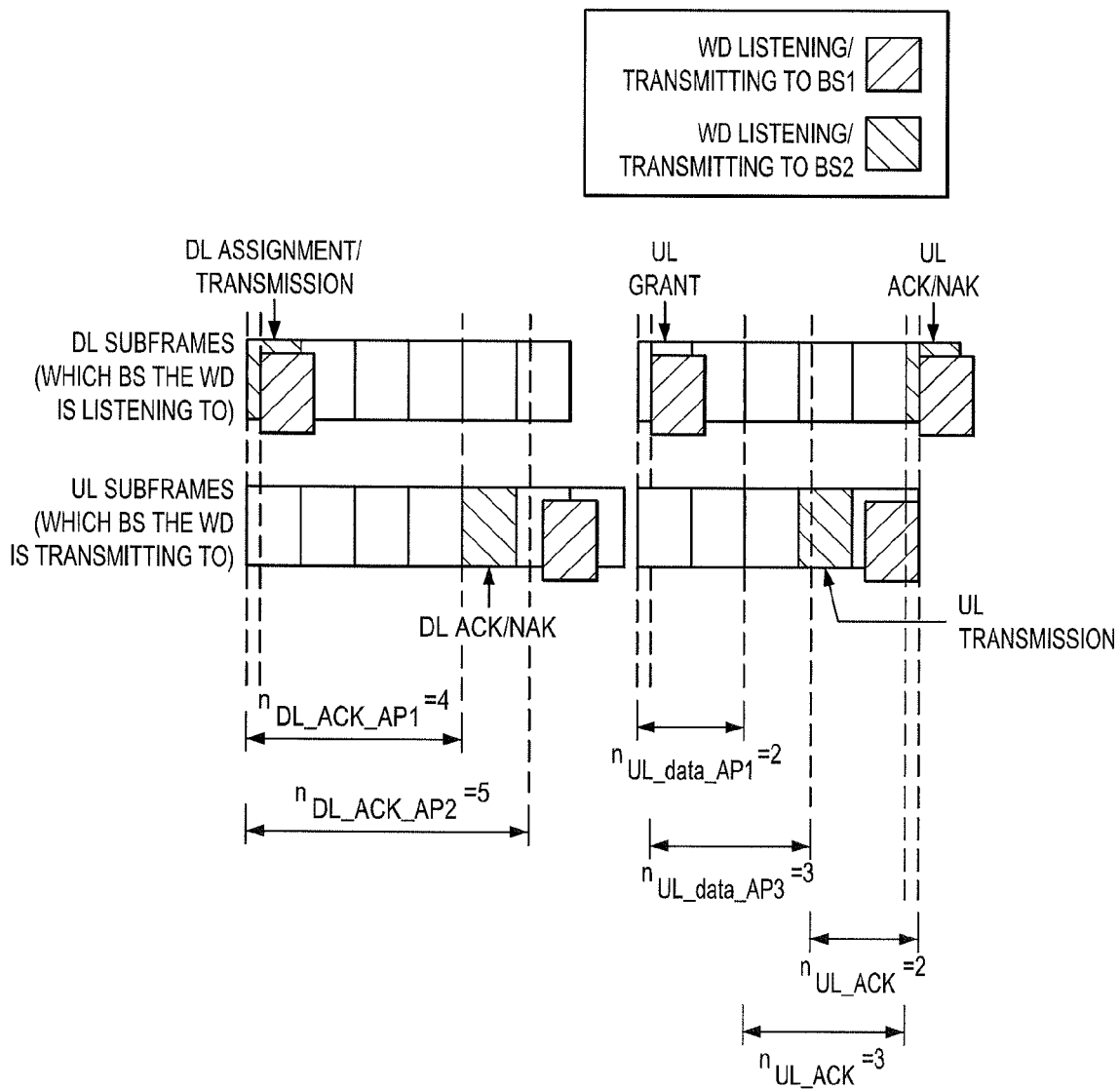
FIG. 13 is another subframe configuration for reception/transmission with a particular set of constants, according to an embodiment of the disclosure.

In one embodiment, the timing of the ACK/NAK responses may be different to allow the WD to send DL ACK/NAK messages to different network nodes in different subframes in response to DL data transmissions received on the same DL subframe. Similarly on the UL, the timing of the UL data transmission relative to the UL grant may be changed for different network nodes to avoid conflict. An example of this is illustrated in FIG. 13, where the network nodes shown are using the same DL subframe. However, the WD communicates on the UL to each network node in different subframes.

In another embodiment, the timing of ACK/NAK response may not be different between network nodes. One or more network nodes may receive DL ACK/NAK responses from the WD via the UL data channel at a different subframe.

Additional alternatives and variations of the embodiments disclosed above will now be considered. The case of receiving only a DL transmission from a network node without a UL data transmission will be discussed. The detailed subframe timing mechanisms in combination with discontinuous reception (DRX) methods will also be discussed. In addition a network node and UL/DL switching guard period will be discussed. Additionally, an embodiment is provided wherein the WD specifies preferred subframes rather than selecting a subframe assignment from a subframe assignment set. In this case, the actual subframes used by each network node may be dependent upon traffic loading.

In the embodiments disclosed herein, DL data transmission and UL data transmission have been shown for each network node. In some embodiments, the WD may communicate with one or more network nodes in a limited manner, such that the WD may receive DL transmissions and provide corresponding acknowledgements. However, the WD and subframe configuration may not allow UL grants, such that there are no UL data transmissions from the WD. In some embodiments, this can simplify the subframe configurations when receiving data from multiple network nodes.

While the discussions above assumed that the subframes assigned to each network node are occupied with data communication, it is possible that the WD may enter a DRX state independently towards each network node. For example, the WD may exchange the bulk of packets with BS1 while maintaining a connection with BS2 in a DRX state. In such a case, two options are available.

In a power saving option, the subframe configuration between BS1 and BS2 may not change. The WD may sleep during subframes unused by BS2. In a capacity enhancement option, the subframe configuration between BS1 and BS2 may effectively change, where subframes unused by BS2 are allocated to BS1 to maximize transmission capacity for the WD. When the WD exits DRX with reference to BS2, the subframe configuration may revert so that the subframes allocated to BS2 can no longer occupied by connection to BS1.

In the above discussion of the embodiments, the switching between different network nodes was shown with minimal delay. In practical applications, some time may be needed for a switch to occur between a first network node and a second network node. Therefore, in an embodiment, a guard period of several symbols or a subframe may be included in a subframe configuration to allow the WD time to switch network nodes. The time may be needed to apply different UL or DL timings as well as context or identification information needed in receiving, transmitting, decoding, or encoding transmissions. The existence of such a guard period may be included in the configuration information described above.

In addition, similar gaps may be needed for switching from DL to UL subframes or from UL to DL subframes. The gaps may be needed in cases of the WD switching network nodes or in cases where the WD is still connected to the same network node. The existence of such a guard period may also be included in the configuration information.

In some embodiments, when a WD identifies subframes that a network node may use and provides the pattern of subframes to the network node, the network node may make the final decision regarding the subframes within that pattern where the network node will allocate resources for that WD. Resource allocation may be based on actual traffic demand.

In these embodiments, the subframe patterns given to different network nodes by a WD may not overlap. For example, if subframe i is enabled in the pattern given to BS1, then subframe i may not be enabled in the pattern given to any other network node. This may require that the WD estimate the maximum traffic load expected to be delivered through each of the connected network nodes and allocate subframes, via the patterns, accordingly. In practice, however, traffic demand is unpredictable. With a fixed allocation of subframes to network nodes, situations may arise where the provisioned subframes are either under-utilized or insufficient to meet traffic demands.

Therefore, in an alternative embodiment, subframes may be assigned to network nodes in a preferential manner. It may be assumed that the set of subframes at a cell E is $S=\{s_1, \ldots, s_n\}$, where n is the number of subframes in the allocation pattern. At the end of n subframes, S is repeated. The interference configuration of E specifies a function and its arguments: the PRU Function $P:S \times E \times L \rightarrow C_E$, that yields a partial ordering of the resources $C_E = (s_i, s_j, \ldots, s_m)$ called PRU Ordering (PRUO), such that:

The argument L is a partial ordering of subframe preferences $L = I_1, I_2, \ldots, I_n$, where $I_1$ specifies the preference of the device for subframe i within cell E.

The resultant PRU Ordering $C_E = (s_i, s_j, \ldots, s_m)$ is a partial order such that the if $s_i$ precedes $s_j$ then $I_i \geq I_j$. Further the subframe $s_i$ is said to be at a higher rank than $s_j$ if $I_i > I_j$, and the same rank as $s_j$ if $I_i = I_j$.

E will assign resources to the device in subframes according to the order specified by $C_E$. If radio resources are not available in subframe $s_i$ then the network node will attempt to schedule resources in subframe $s_j$, where $s_i$ is a subframe at a higher or the same rank as $s_j$.

The partial order is such that consecutive subframes $s_i, s_j, \ldots, s_k$ are equally likely to be used if and only if, $I_i = I_j = \ldots = I_k$.

The partial ordering may exclude some resources: $s_k \notin C_E$, indicating that the cell may not use the subframe at all. In this manner, conventional ABS-like configuration is specified as part of the interference configuration.

The complement of the PRUO—preferred resources to avoid order (PRAO)—is derived from a given PRUO by reversing the order of the resources—i.e., $C_E^R = (s_m, \ldots, s_j, s_i)$.

In this way, the WD may provide overlapping patterns to different network nodes but with different preferences for each network node.

Since the traffic load through each network node is unpredictable and varying, this embodiment uses the concept of statistical multiplexing whereby, in many cases, an increase in the traffic load in one cell is balanced by a decrease in the load in the other cells. This embodiment uses the observation that the chance of peak simultaneous load on all cells that may interfere with each other is, statistically, a low probability event.

In another embodiment, a wireless device may coordinate with a first network node to allow reception of broadcast information from the first network node within a first set of radio resources. The wireless device may also coordinate radio resources with the first network node to allow reception of paging from the first network node within the first set of radio resources. In addition, the wireless device may receive timing advances from the first network node. The wireless device, based on receiving further timing advances from one or more network nodes, may determine that there is a conflict and may initiate a change in the coordination of radio resources to one or more network nodes. In some embodiments, after the wireless device indicates a set of radio resources to a network node, the wireless device may not transmit another indication of preferred radio resources to that network node for a predetermined period of time.

In contrast to CoMP, the embodiments disclosed herein focus on applications that do not require synchronized transmissions from the network nodes and assume that transmissions from different network nodes may be on different time frequency resources. In order to avoid interference when communicating with the network nodes, the timing of the transmissions and signaling from each of the network nodes is coordinated by the receiving WD.

In contrast to ABS, network node transmissions to and from a WD may be coordinated by the device itself. Instead of relying on a semi-static configuration of ABS patterns, the embodiments disclosed herein enable a resource sharing scheme that is more dynamic and may be based on actual traffic demand in overlapping regions of the coverage area.

The embodiments disclosed herein allow a WD to send and receive information from multiple network nodes in a coordinated manner. Contemporaneous communication with multiple network nodes may enable a number of enhanced services, including seamless handover between network nodes, transmission of different user traffic flows via different network nodes, multi-band carrier aggregation, and macro-controlled small cell access. Coordinated transmissions may ensure that transmissions to and from one network node do not interfere with transmissions to and from another network node.

The embodiments may, for example, be applicable to cases of dual connectivity, whereby a WD communicates contemporaneously to both a pico cell and a macro cell.

In summary, the embodiments may allow a WD to maintain contact with multiple network nodes. In the absence of inter-network node communication, the embodiments may allow a WD to configure the timing of communications for transmissions to and from the device. The embodiments may also eliminate the need to exchange user plane and control plane information among the network nodes over the backhaul network. In addition, the embodiments may enable communication with multiple network nodes in a simplified WD with only one radio frequency transmit and/or receive chain.

Figure 14:
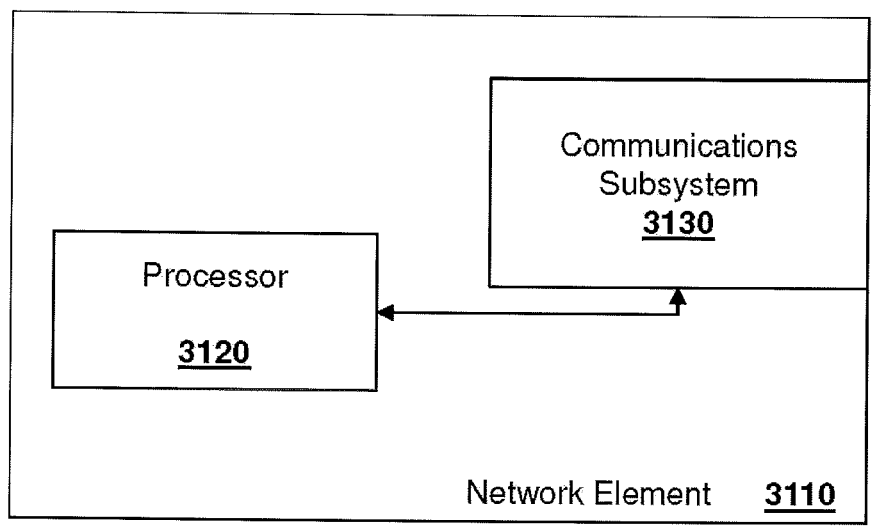
FIG. 14 is a simplified block diagram of an exemplary network element according to one embodiment.

The above may be implemented by a network element. A simplified network element is shown with regard to FIG. 14. In the figure, network element 3110 includes a processor 3120 and a communications subsystem 3130, where the processor 3120 and communications subsystem 3130 cooperate to perform the methods described above.

Figure 15:
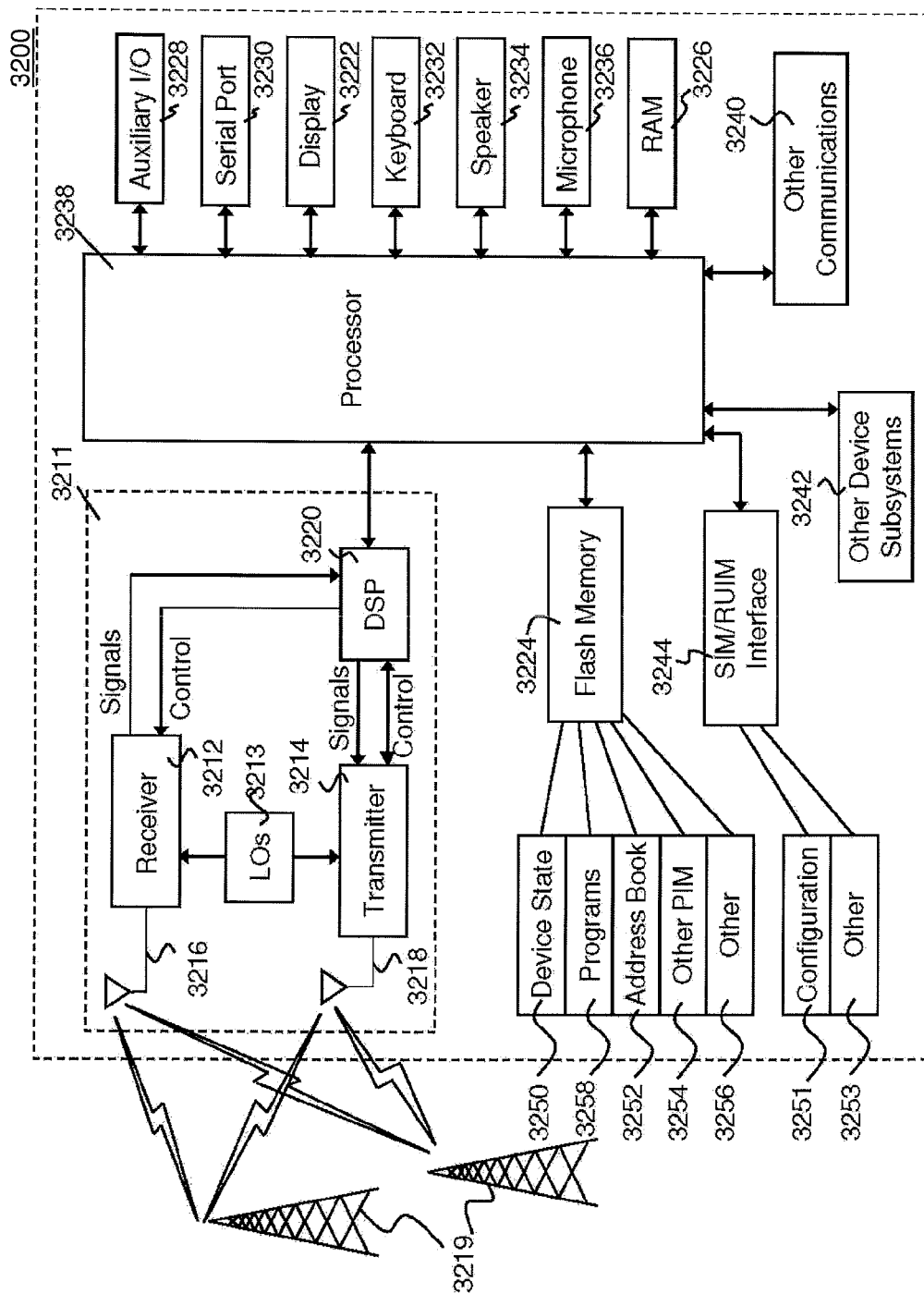
FIG. 15 is a block diagram with an example user equipment capable of being used with the systems and methods in the embodiments described herein.

Further, the above may be implemented by a WD. One exemplary device is described below with regard to FIG. 15. In the figure, WD 3200 includes a processor 3238 and a communications subsystem 3211, where the processor 3238 and communications subsystem 3211 cooperate to perform the methods described above.

In an embodiment, a method is provided for communication in a wireless telecommunications network. The method comprises coordinating, by a wireless device, with a first network node to identify a first radio resource configuration comprising a first set of radio resources which is used by the wireless device to communicate with the first network node. The first set of radio resources comprises at least one of radio resources in which the wireless device transmits to the first network node or radio resources in which the wireless device receives from the first network node.

In another embodiment, a wireless device is provided. The wireless device comprises a processor configured such that the wireless device coordinates, with a first and second network node, a radio resource configuration to be used in communications between the wireless device and the first network node and in communications between the wireless device and the second network node. The radio resource configuration comprises a first set of radio resources configured for use with the first network node and a second set of radio resources configured for use with the second network node. The first set of radio resources is disjoint from the second set of radio resources.

In another embodiment, a method is provided for communication in a wireless telecommunications network. The method comprises a first network node coordinating with a second network node to establish a configuration for radio resources with which the first network node and the second network node will communicate with a wireless device. The configuration comprises a first set of radio resources with which the first network node communicates with the wireless device and a second set of radio resources with which the second network node communicates with the wireless device. The method further comprises the first network node transmitting the configuration to the wireless device.

The following are incorporated herein by reference for all purposes: 3GPP Technical Specification (TS) 36.211, 3GPP TS 36.213, 3GPP TS 36.300, 3GPP TS 36.321, and 3GPP TR 36.331.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunications network, the method comprising:
coordinating, by a wireless device, with a first network node to identify a first radio resource configuration comprising a first set of radio resources which is used by the wireless device to communicate with the first network node, the first set of radio resources comprising at least:
radio resources in which the wireless device transmits to the first network node, and
radio resources in which the wireless device receives from the first network node,
wherein the coordinating comprises:
selecting, by the wireless device, based on conditions in the network, the first radio resource configuration comprising the first set of radio resources; and
communicating the first radio resource configuration to the first network node,
wherein the radio resource configuration contains ordering information for the elements of the set of radio resources, such that the first network node schedules the wireless device in resources of the set according to the order provided.

2. The method of claim 1, wherein the wireless device coordinates with a second network node to identify a second radio resource configuration comprising a second set of radio resources such that the second set of radio resources is disjoint from the first set of radio resources.

3. The method of claim 2, wherein an element in the second set of radio resources is disjoint from an element in the first set of radio resources in at least one of:
time;
frequency;
space; and
code.

4. The method of claim 1, wherein the coordinating comprises:
selecting, by the wireless device, based on conditions in the network, one of a plurality of radio resource configurations that are available for selection by the wireless device; and
communicating the selected radio resource configuration to the first network node.

5. The method of claim 1, wherein the method further comprises:
selecting, by the wireless device, based on updated conditions in the network, a new radio resource configuration comprising a different set of radio resources to be used to communicate between the wireless device and the first network node; and
communicating the new radio resource configuration to the first network node.

6. The method of claim 1, wherein the coordinating comprises:
determining, by a second network node, based on conditions in the network, a second radio resource configuration; and
communicating to the wireless device the second radio resource configuration.

7. The method of claim 6, wherein the wireless device is configured to select a new radio resource configuration to communicate with the first network node upon determining that there is a conflict between the first radio resource configuration and the second radio resource configuration, wherein the new radio resource configuration is communicated, by the wireless device, to the first network node.

8. The method of claim 1, wherein the set of radio resources allows the wireless device to maintain a discontinuous reception (DRX) transmission mode towards at least one of the network nodes.

9. The method of claim 1, wherein a guard period is included with the radio resource configuration to indicate a time duration during which the wireless device does not transmit wireless signals.

10. The method of claim 1, wherein, when the wireless device receives transmissions from more network nodes than the wireless transmits to, the timing of acknowledgement/negative acknowledgement responses from the wireless device allows the wireless device to send uplink acknowledgement/negative acknowledgement messages to different network nodes in different subframes in response to downlink data transmissions received on the same downlink subframe.

11. The method of claim 1, wherein the number of wireless transmit/receive chains on the wireless device is less than the number of connections for which the wireless device is concurrently coordinating radio resources for communications.

12. The method of claim 1, wherein the wireless device coordinates with a second network node to identify a second radio resource configuration comprising a second set of radio resources and ordering information, wherein the second set of radio resources is not disjoint from the first set of radio resources.

13. A wireless device comprising:
a processor configured such that the wireless device coordinates, with a first and second network node, a radio resource configuration to be used in communications between the wireless device and the first network node and in communications between the wireless device and the second network node,
wherein the radio resource configuration comprises a first set of radio resources configured for use with the first network node and a second set of radio resources configured for use with the second network node, and
wherein the first set of radio resources is disjoint from the second set of radio resources,
the processor further configured such that the wireless device:
selects the first and second sets of radio resources based on network conditions;
a transceiver configured such that the wireless device:
communicates the first and second sets of radio resources to the first network node; and
uses the first and second sets of radio resources to transmit to and receive from the first network node.

14. The wireless device of claim 13, wherein a plurality of radio resource configurations are available for selection by the wireless device, and the wireless device selects one of the radio resource configurations based on conditions in a network in which the wireless device, the first network node, and the second network node are present.

15. The wireless device of claim 13, wherein the wireless device transmits the first radio resource configuration to the first network node after having received the second radio resource configuration from the second network node, the second network node having determined the second radio resource configuration based on conditions in a network in which the wireless device, the first network node, and the second network node are present.

16. The wireless device of claim 13, wherein an element in the second set of radio resources is disjoint from an element in the first set of radio resources in one or more of:
time;
frequency;
space; and
code.

17. The wireless device of claim 13, wherein the sets of radio resources allow the wireless device to maintain a discontinuous reception (DRX) transmission mode towards at least one of the network nodes.

18. The wireless device of claim 13, wherein a guard period is included with the radio resource configuration to indicate a time duration during which the wireless device does not transmit wireless signals.

19. The wireless device of claim 13, wherein, when the wireless device receives transmissions from more network nodes than the wireless transmits to, the timing of acknowledgement/negative acknowledgement responses from the wireless device allows the wireless device to send uplink acknowledgement/negative acknowledgement messages to different network nodes in different subframes in response to downlink data transmissions received on the same downlink subframe.

20. The wireless device of claim 13, wherein the number of wireless transmit/receive chains on the wireless device is less than the number of connections for which the wireless device is concurrently coordinating radio resources for communications.

21. A method for communication in a wireless telecommunications network, the method comprising:
    a first network node coordinating with a second network node to establish a configuration for radio resources with which the first network node and the second network node will communicate with a wireless device, the configuration comprising:
        a first set of radio resources with which the first network node communicates with the wireless device, and
        a second set of radio resources with which the second network node communicates with the wireless device; and
    the first network node transmitting the configuration to the wireless device,
    wherein the configuration contains ordering information for elements of at least one of the first and second sets of radio resources, such that at least one of the first and second network nodes schedules the wireless device in resources of the at least one set according to the order provided.

22. The method of claim 21, wherein the first network node selects a radio resource configuration from a plurality of predefined configurations.

23. The method of claim 21, wherein the first network node and the second network node determine a radio resource pattern, and wherein the first network node transmits the pattern to the wireless device.

* * * * *